(12) United States Patent
Yamashita

(10) Patent No.: US 10,882,514 B2
(45) Date of Patent: Jan. 5, 2021

(54) AUTOMATIC PARKING CONTROL DEVICE AND AUTOMATIC PARKING SYSTEM

(71) Applicant: TOYOTA JIDOSHA KABUSHIKI KAISHA, Toyota (JP)

(72) Inventor: Keiji Yamashita, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 15/970,149

(22) Filed: May 3, 2018

(65) Prior Publication Data

US 2019/0031188 A1 Jan. 31, 2019

(30) Foreign Application Priority Data

Jul. 27, 2017 (JP) ................................. 2017-145349

(51) Int. Cl.
*B60W 30/06* (2006.01)
*B62D 15/02* (2006.01)

(52) U.S. Cl.
CPC ......... *B60W 30/06* (2013.01); *B62D 15/0285* (2013.01); *B60T 2201/10* (2013.01); *B60W 2510/0638* (2013.01); *B60W 2510/081* (2013.01); *B60W 2510/18* (2013.01); *B60W 2510/20* (2013.01); *B60W 2540/215* (2020.02)

(58) Field of Classification Search
CPC ... B60T 2201/10; B60W 10/06; B60W 10/18; B60W 30/06; B60W 2510/0638; B60W 2510/081; B60W 2510/18; B60W 2510/20; B60W 2520/28; B60W 2540/215; B60W 2554/00; B60W 2710/06; B60W 2710/182; B62D 15/0285
See application file for complete search history.

(56) References Cited

U.S. PATENT DOCUMENTS

| | | | |
|---|---|---|---|
| 2007/0027598 A1* | 2/2007 | Mori ............... | B60W 30/18063 701/41 |
| 2015/0111693 A1* | 4/2015 | Wang ............... | B60W 20/50 477/5 |
| 2017/0113675 A1* | 4/2017 | Oguri .............. | B60W 10/184 |
| 2017/0120892 A1* | 5/2017 | Kato ............... | B60W 10/04 |

(Continued)

FOREIGN PATENT DOCUMENTS

| JP | 2008-149853 A | 7/2008 |
|---|---|---|
| JP | 2014-226975 A | 12/2014 |

*Primary Examiner* — Robert T Nguyen
(74) *Attorney, Agent, or Firm* — Sughrue Mion, PLLC

(57) ABSTRACT

An automatic parking control device includes an electronic control unit. A remaining distance from a first position to a target position is longer than a remaining distance from a second position to the target position. In a case where a braking force increase process is executed at the first position, the electronic control unit delays timing at which the braking force is increased, or reduces an amount by which the braking force is increased, as compared to a case where the braking force increase process is executed at the second position. In a case where a braking force reduction process is executed at the first position, the electronic control unit advances timing at which the braking force is reduced or increases an amount by which the braking force is reduced, as compared to a case where the braking force reduction process is executed at the second position.

6 Claims, 8 Drawing Sheets

(56) References Cited

U.S. PATENT DOCUMENTS

| | | | | |
|---|---|---|---|---|
| 2018/0208245 A1* | 7/2018 | Mizutani | ............... | G06F 3/167 |
| 2019/0162304 A1* | 5/2019 | Kida | ............... | F16H 63/48 |
| 2019/0185000 A1* | 6/2019 | Seo | ............... | B60W 30/06 |

\* cited by examiner

AUTOMATIC PARKING CONTROL DEVICE AND AUTOMATIC PARKING SYSTEM

INCORPORATION BY REFERENCE

The disclosure of Japanese Patent Application No. 2017-145349 filed on Jul. 27, 2017 including the specification, drawings and abstract is incorporated herein by reference in its entirety.

BACKGROUND

1. Technical Field

The disclosure relates to an automatic parking control device and an automatic parking system provided to automatically park a vehicle.

2. Description of Related Art

An automatic parking system provided to automatically park a vehicle at a target position is disclosed in Japanese Patent Application Publication No. 2008-149853 (JP 2008-149853 A). The automatic parking system automatically moves the vehicle to the target position with the use of creep travel.

SUMMARY

As described above, the automatic parking system automatically moves the vehicle to the target position with the use of the creep travel. However, in order to move the vehicle to the target position with a high degree of accuracy, the vehicle needs to travel at a lower speed than a speed during the creep travel. Therefore, an engine is operated at an idle speed, and a brake is applied, so as to control the vehicle travel. That is, the vehicle travel at an extremely low speed is realized by combining a braking force and drive power that corresponds to the idle speed.

A case where the idle speed of the engine changes during vehicle travel control for automatic parking will be considered. Reasons for the change of the idle speed include turning ON/OFF of an air conditioner, a rapid warming operation, travel on a slope, a steering operation, and so on. The drive power is related to the idle speed during the vehicle travel control with the use of the creep travel. Thus, when the idle speed changes, the drive power also changes in accordance with the change of the idle speed. When the drive power is rapidly changed during the vehicle travel at the extremely low speed, a shock occurs due to acceleration or deceleration, and an occupant of the vehicle feels a sense of discomfort.

The disclosure provides a technique capable of reducing a sense of discomfort felt by an occupant of a vehicle during vehicle travel control for automatic parking.

A first aspect of the disclosure relates to an automatic parking control device that is mounted on a vehicle. The vehicle includes an engine that generates drive power, and a braking system that generates a braking force. The automatic parking control device includes an electronic control unit configured to execute: vehicle travel control for controlling the drive power and the braking force so as to automatically move the vehicle to a target position; a braking force increase process for increasing the braking force in a case where an idle speed of the engine is increased such that the drive power is increased during the vehicle travel control; and a braking force reduction process for reducing the braking force in a case where the idle speed is reduced such that the drive power is reduced during the vehicle travel control. A remaining distance from a first position to the target position is longer than a remaining distance from a second position to the target position. The electronic control unit is configured to, in a case where the braking force increase process is executed at the first position, delay timing at which the braking force is increased, or reduce an amount by which the braking force is increased, as compared to a case where the braking force increase process is executed at the second position. The electronic control unit is configured to, in a case where the braking force reduction process is executed at the first position, advance timing at which the braking force is reduced or increase an amount by which the braking force is reduced, as compared to a case where the braking force reduction process is executed at the second position.

In the above aspect, the electronic control unit may be configured to execute the braking force increase process while gradually increasing the drive power in a case where a request to increase the idle speed is present; and the electronic control unit may be configured to execute the braking force reduction process while gradually reducing the drive power in a case where a request to reduce the idle speed is present.

In the above aspect, the electronic control unit may be configured not to reduce the drive power even in a case where a request to reduce the idle speed is present.

In the above aspect, the drive power during idling of the engine may be basic drive power; and the electronic control unit may be configured to increase the basic drive power in response to start of an automatic parking function.

A second aspect of the disclosure relates to an automatic parking system that is mounted on a vehicle. The automatic parking system includes an engine that generates drive power; a braking system that generates a braking force; and an automatic parking control device. The automatic parking control device includes an electronic control unit configured to execute: vehicle travel control for controlling the drive power and the braking force so as to automatically move the vehicle to a target position; a braking force increase process for increasing the braking force in a case where an idle speed of the engine is increased such that the drive power is increased during the vehicle travel control; and a braking force reduction process for reducing the braking force in a case where the idle speed is reduced such that the drive power is reduced during the vehicle travel control. A remaining distance from a first position to the target position is longer than a remaining distance from a second position to the target position. The electronic control unit is configured to, in a case where the braking force increase process is executed at the first position, delay timing at which the braking force is increased, or reduce an amount by which the braking force is increased, as compared to a case where the braking force increase process is executed at the second position. The electronic control unit is configured to, in a case where the braking force reduction process is executed at the first position, advance timing at which the braking force is reduced or increase an amount by which the braking force is reduced, as compared to a case where the braking force reduction process is executed at the second position.

According to the above aspects of the disclosure, in the case where the idle speed changes such that the drive power changes (the drive power is increased or reduced) during the vehicle travel control for automatic parking, a braking force change process (the braking force increase process or the braking force reduction process) is executed, so as to offset the change of the drive power. In this braking force change process, braking force change timing (braking force increase timing or braking force reduction timing) or a braking force change amount (a braking force increase amount or a braking force reduction amount) is set such that an occupant can feel that motion of the vehicle is "appropriate motion".

For example, in the braking force increase process, the braking force increase timing at the first position that is far from the target position is set to be later than the braking force increase timing at the second position that is close to the target position. In addition, in the braking force reduction process, the braking force reduction timing at the first position that is far from the target position is set to be earlier than the braking force reduction timing at the second position that is close to the target position.

As a result, at the first position that is far from the target position, the vehicle is more likely to accelerate while the vehicle is less likely to decelerate. The acceleration at the position far from the target position is felt as the "acceleration for promptly approaching the target position" and thus is appropriate. In contrast, at the second position that is close to the target position, the vehicle is more likely to decelerate while the vehicle is less likely to accelerate. The deceleration at the position close to the target position is felt as the "deceleration for stopping at the target position shortly" and thus is appropriate. Thus, the motion of the vehicle that is felt as natural and appropriate motion by the occupant is realized. In other words, it is possible to reduce the sense of discomfort felt by the occupant of the vehicle during the vehicle travel control for the automatic parking.

In addition, since the vehicle is less likely to accelerate at the second position that is close to the target position, it is possible to reduce the possibility that the vehicle passes the target position. Furthermore, since the vehicle is less likely to decelerate at the first position that is far from the target position, it is possible to reduce the possibility that the vehicle stops before arriving at the target position. Thus, accuracy of the automatic parking function is improved. As a result, reliability of the automatic parking system is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will be provided on embodiments of the disclosure with reference to the accompanying drawings.

Figure 1:
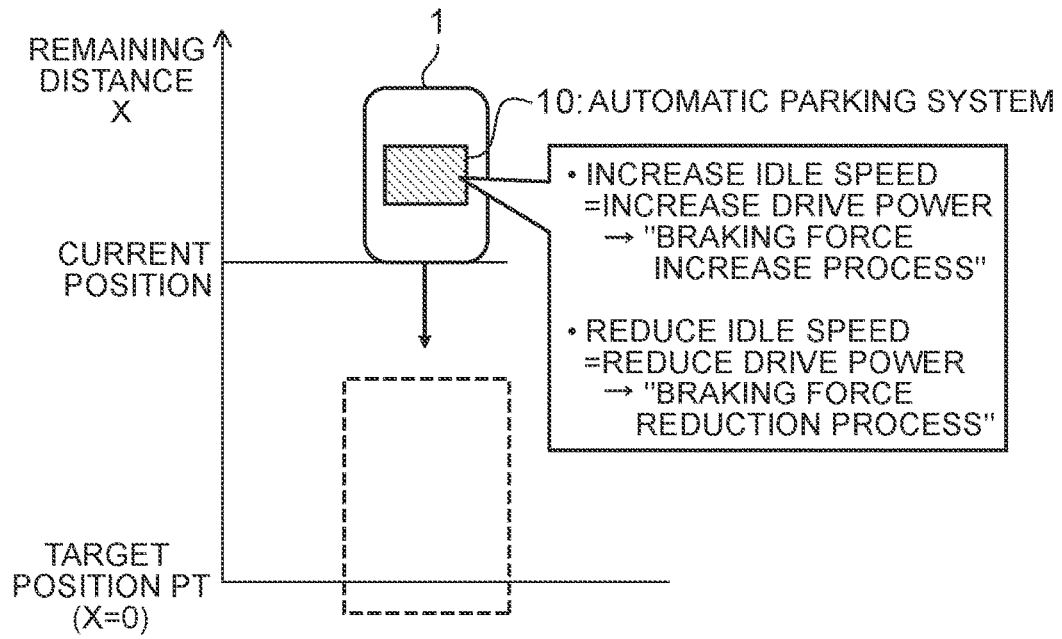
FIG. 1 is a conceptual view illustrating an automatic parking system according to a first embodiment of the disclosure.

Hereinafter, a first embodiment of the disclosure will be described. FIG. 1 is a conceptual view illustrating an automatic parking system 10 according to the first embodiment of the disclosure. The automatic parking system 10 is mounted on a vehicle 1 and provides an automatic parking function to automatically park the vehicle 1. In automatic parking, a target parking position to which the vehicle 1 should be guided will hereinafter be referred to as a "target position PT". The automatic parking system 10 executes "vehicle travel control" for automatically moving (guiding) the vehicle 1 to the target position PT.

The vehicle travel control includes vehicle speed control (drive power control and braking force control), steering control, and shift control. As will be described below, the embodiment will particularly focus on the "vehicle speed control". The steering control and the shift control are not particularly limited.

In the embodiment, the vehicle 1 can perform creep travel (i.e., the vehicle 1 can creep), and the automatic parking system 10 automatically moves the vehicle 1 to the target position PT with the use of the creep travel. However, in order to move the vehicle 1 to the target position PT with a high degree of accuracy, the vehicle 1 needs to travel at a lower speed than a speed during the creep travel. Therefore, an engine is operated at an idle speed and a brake is applied, so as to control the vehicle travel. That is, the vehicle travel at an extremely low speed is realized by combining a braking force and drive power that corresponds to the idle speed.

A case where the idle speed of the engine changes during the vehicle travel control for the automatic parking will be considered. Reasons for the change of the idle speed include turning ON/OFF of an air conditioner, a rapid warming operation, travel on a slope, a steering operation, and so on. The drive power is related to the idle speed during the vehicle travel control with the use of the creep travel. Thus, when the idle speed changes, the drive power also changes in accordance with the change of the idle speed. When the drive power is rapidly changed during the vehicle travel at the extremely low speed, a shock occurs due to acceleration or deceleration, and an occupant (typically a driver) of the vehicle 1 feels a sense of discomfort.

In the case where the drive power is increased near the target position PT during the vehicle travel at the extremely low speed, the vehicle 1 may pass the target position PT. In the case where the drive power is reduced at a position far from the target position PT, the vehicle 1 may stop before arriving at the target position PT. That is, the change of the drive power during the vehicle travel control decreases the accuracy of the automatic parking function. Accordingly, reliability of the automatic parking system 10 is decreased.

In view of the above, in the case where the drive power changes during the vehicle travel control, the automatic parking system 10 according to the embodiment changes the braking force so as to offset (cancel) the change of the drive power. More specifically, in the case where the drive power is increased in accordance with an increase in the idle speed, in order to offset the increase in the drive power, the automatic parking system 10 increases the braking force. This process will hereinafter be referred to as a "braking force increase process". In the case where the drive power is reduced in accordance with a reduction in the idle speed, in order to offset the reduction in the drive power, the automatic parking system 10 reduces the braking force. This process will hereinafter be referred to as a "braking force reduction process". The braking force increase process and the braking force reduction process will be collectively referred to as a "braking force change process".

Note that the above problem cannot be solved in the case where acceleration/deceleration of the vehicle 1 due to the change of the drive power is detected by an acceleration sensor and then the braking force change process is executed. In order to effectively offset the change of the drive power, it is conceivable to predict drive power change timing (i.e., timing at which drive power is changed) and to execute the braking force change process such that the braking force is changed at the drive power change timing. For example, in response to an ON/OFF operation of the air conditioner, a signal that requests the increase/reduction in the idle speed (hereinafter referred to as an "idle UP/DOWN request") is generated. It may be possible to predict the drive power change timing from reception timing of the idle UP/DOWN request (i.e., timing at which the idle UP/DOWN request is received).

However, because the drive power change timing depends on a signal transmission time period, a calculation processing time period, a calculation cycle, an actuator response speed, and so on, it is difficult to predict the precise drive power change timing. In addition, even when the precise drive power change timing is predicted, it is difficult to change the braking force at the drive power change timing. This is because braking force change timing (i.e., timing at which braking force is changed) also depends on the signal transmission time period, the calculation processing time period, the calculation cycle, the actuator response speed, and so on.

In view of the above, the automatic parking system 10 according to the embodiment adopts the following novel approach for the braking force change process. The automatic parking system 10 actively adjusts the braking force change timing while permitting a certain deviation (difference) between the drive power change timing and the braking force change timing so that the occupant can feel that motion of the vehicle 1 is "appropriate motion (or natural motion)".

Figure 2:
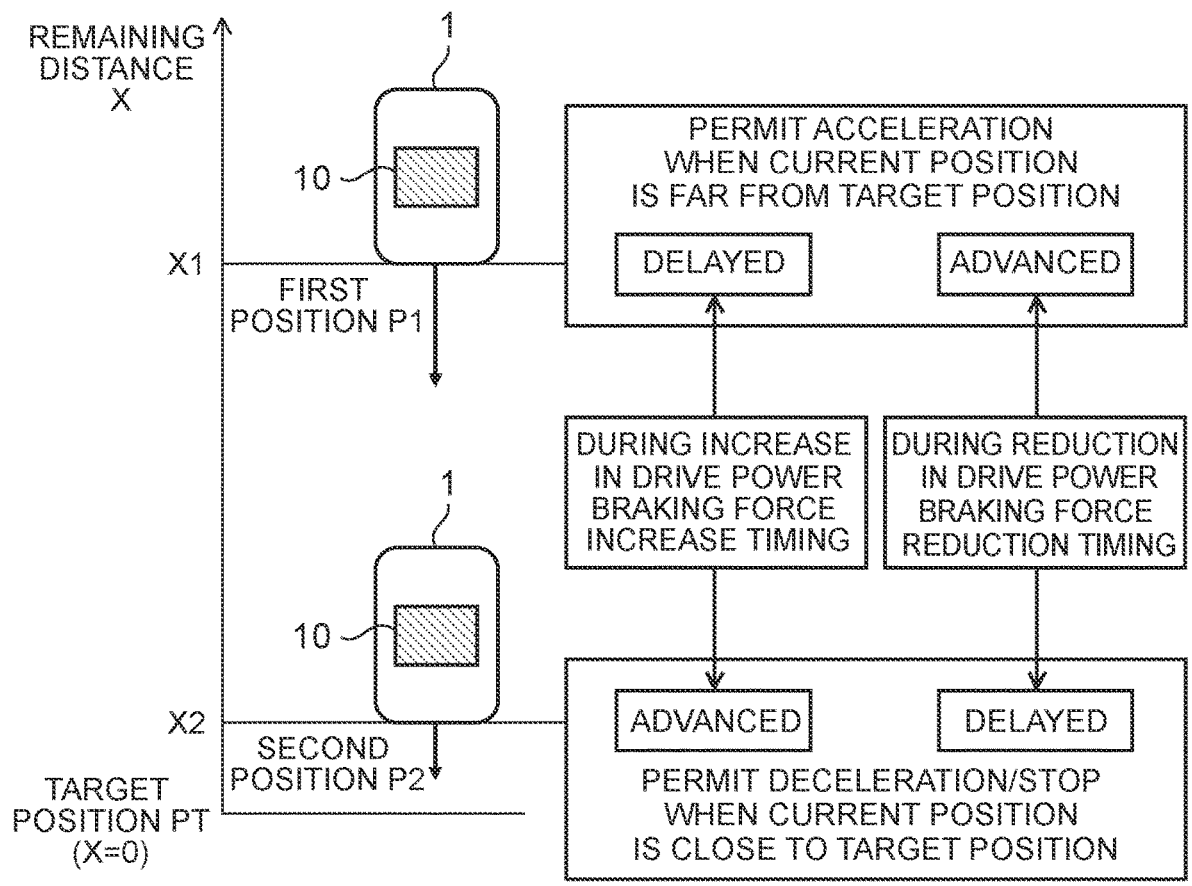
FIG. 2 is a conceptual view illustrating an overview of a braking force change process (a braking force increase process and a braking force reduction process) in the automatic parking system according to the first embodiment of the disclosure.

FIG. 2 is a conceptual view illustrating an overview of the braking force change process (the braking force increase process and the braking force reduction process) according to the embodiment. In FIG. 2, a remaining distance X represents a distance from a current position of the vehicle 1 to the target position PT. The target position PT is a position where the remaining distance X=0.

FIG. 2 also shows two positions that are a first position P1 and a second position P2. The first position P1 is a position relatively far from the target position PT, and the second position P2 is a position relatively close to the target position PT. That is, a remaining distance X1 from the first position P1 to the target position PT is longer than a remaining distance X2 from the second position P2 to the target position PT (X1>X2).

First, a case where the drive power changes at the first position P1 that is far from the target position PT will be considered. In the case where the vehicle 1 accelerates at the position far from the target position PT, such acceleration is felt as "acceleration for promptly approaching the target position PT (acceleration for reducing the distance)". That is, the acceleration of the vehicle 1 at the position far from the target position PT is the "appropriate motion (the natural motion)" and thus is permitted.

In contrast, the deceleration or a stop of the vehicle 1 at the position far from the target position PT is unnatural and thus should not be permitted. In particular, the stop of the vehicle 1 at the position far from the target position PT is not preferred.

In view of the above, in the case where the drive power is increased at the first position P1 that is far from the target position PT, the automatic parking system 10 actively delays braking force increase timing in the braking force increase process. In the case where the drive power is reduced at the first position P1 that is far from the target position PT, the automatic parking system 10 actively advances braking force reduction timing in the braking force reduction process. As a result of such adjustment of the braking force change timing, the vehicle 1 is more likely to accelerate while the vehicle 1 is less likely to decelerate or stop. Even when the vehicle 1 accelerates, such acceleration is felt as natural and appropriate motion.

Next, a case where the drive power changes at the second position P2 that is close to the target position PT will be considered. In the case where the vehicle 1 decelerates at the position close to the target position PT, such deceleration is felt as "deceleration for stopping at the target position PT shortly". In the case where the vehicle 1 is located almost at the target position PT, even when the vehicle 1 stops, the occupant does not feel that the stop of the vehicle 1 is unnatural. That is, the deceleration/stop of the vehicle 1 at the position close to the target position PT is the "appropriate motion (the natural motion)" and thus is permitted. In contrast, when the vehicle 1 accelerates at the position close to the target position PT, the vehicle 1 may pass the target position PT, and thus such acceleration is not preferred. In particular, in the case where a wall exists behind the target position PT, passing the target position PT should not be permitted.

In view of the above, in the case where the drive power is increased at the second position P2 that is close to the target position PT, the automatic parking system 10 actively advances the braking force increase timing in the braking force increase process. In the case where the drive power is reduced at the second position P2 that is close to the target position PT, the automatic parking system 10 actively delays the braking force reduction timing in the braking force reduction process. As a result of such adjustment of the braking force change timing, the vehicle 1 is more likely to decelerate or stop while the vehicle 1 is less likely to accelerate. Even when the vehicle 1 decelerates or stops, such deceleration or a stop is felt as natural and appropriate motion.

As described above, the automatic parking system 10 sets (adjusts) the braking force change timing in the braking force change process in accordance with the remaining distance X to the target position PT. As shown in FIG. 2, in the case where the braking force increase process is executed at the first position P1, the braking force increase timing is set to be delayed, as compared to the case where the braking force increase process is executed at the second position P2. In addition, in the case where the braking force reduction process is executed at the first position P1, the braking force reduction timing is set to be advanced, as compared to the case where the braking force reduction process is executed at the second position P2. With such settings, the motion of the vehicle 1 that is felt as natural and appropriate motion by the occupant is realized.

As described above, in the case where the idle speed changes such that the drive power changes during the vehicle travel control for the automatic parking, the automatic parking system 10 according to the embodiment executes the braking force change process, so as to offset the change of the drive power. Since the braking force change timing in this braking force change process is set in accordance with the remaining distance X as described above, the motion of the vehicle 1 that is felt as natural and appropriate motion by the occupant is realized. That is, it is possible to reduce the sense of discomfort felt by the occupant of the vehicle 1 during the vehicle travel control for the automatic parking.

In addition, in the case where the drive power is reduced at the first position P1 that is far from the target position PT, the braking force reduction timing is advanced. Thus, the vehicle 1 is less likely to stop at the position far from the target position PT. Furthermore, in the case where the drive power is increased at the second position P2 that is close to the target position PT, the braking force increase timing is advanced. Thus, the vehicle 1 is less likely to accelerate at the position close to the target position PT. This reduces the possibility that the vehicle 1 passes the target position PT. Thus, the accuracy of the automatic parking function is improved. As a result, the reliability of the automatic parking system 10 is improved.

A description will hereinafter be provided on a specific example of the automatic parking system 10 according to the embodiment.

Figure 3:
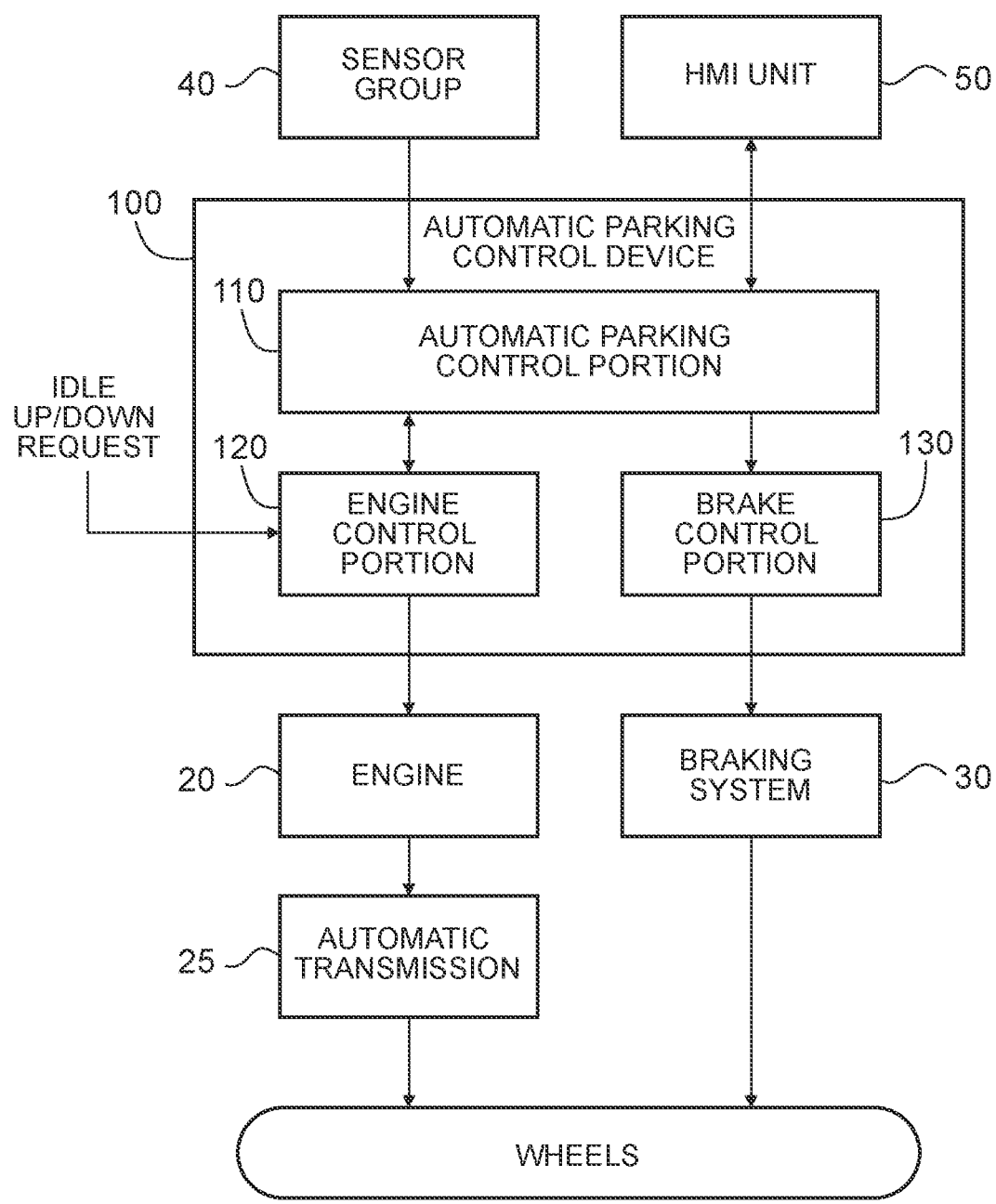
FIG. 3 is a block diagram of a configuration example of the automatic parking system according to the first embodiment of the disclosure.

FIG. 3 is a block diagram of a configuration example of the automatic parking system 10 according to the embodiment. The automatic parking system 10 is mounted on the vehicle 1 and includes an engine 20, an automatic transmission 25, a braking system 30, a sensor group 40, a human machine interface (HMI) unit 50, and an automatic parking control device 100.

The engine 20 generates the drive power. This engine 20 is connected to wheels via the automatic transmission 25. The automatic transmission 25 includes a torque converter, for example. When the engine 20 is in an idle state, the drive power that corresponds to the idle speed is transmitted to the wheels via the automatic transmission 25. The vehicle 1 can perform the creep travel with the use of the drive power. The drive power (creep torque) during this creep travel is used in the vehicle travel control for the automatic parking. When the idle speed of the engine 20 is changed, the drive power (the creep torque) is also changed in accordance with a change in the idle speed.

The braking system 30 generates the braking force. This braking system 30 includes a master cylinder, a brake actuator, and a wheel cylinder provided for each of the wheels. The brake actuator supplies brake fluid that is discharged from the master cylinder to the wheel cylinder and thereby generates a brake pressure (that is, the braking force).

The sensor group 40 is provided to detect required information for an automatic parking process. In particular, the sensor group 40 includes an external sensor provided to recognize a situation around the vehicle 1. For example, the external sensor includes a camera that captures an image of the situation around the vehicle 1.

Based on imaging information captured by the camera, the target position PT can be recognized, and the remaining distance X to the target position PT can be calculated. The external sensor may include an ultrasonic sonar (a clearance sonar) that detects an obstacle in the periphery of the vehicle 1. The remaining distance X to the target position PT can be calculated with the use of the ultrasonic sonar. The sensor group 40 may further include a wheel rotational speed sensor that detects a rotational speed of each of the wheels. Based on a detection result obtained by the wheel rotational speed sensor, a travel distance of the vehicle 1 can be calculated. The sensor group 40 sends the detected information to the automatic parking control device 100.

The HMI unit 50 is an interface that provides the information to the driver of the vehicle 1 and receives the information from the driver. The HMI unit 50 includes an input device, a display, and a speaker, for example. Examples of the input device include a touch panel (touch screen), a keyboard, a switch, and a button. In particular, the input device includes an "automatic parking switch" for turning the automatic parking function ON/OFF. The driver can input the information to the HMI unit 50 with the use of the input device. The HMI unit 50 sends the information input by the driver to the automatic parking control device 100.

The automatic parking control device 100 is a control device that controls the automatic parking. The automatic parking control device 100 is realized by an electronic control unit (ECU). The ECU is a microcomputer that includes a processor, memory, and input/output interfaces. The automatic parking control device 100 receives the information from the sensor group 40 and the HMI unit 50 and controls the automatic parking on the basis of the received information. In particular, the automatic parking control device 100 executes a "target position setting process" to set the target position PT and executes the "vehicle travel control" to control the drive power and the braking force so as to automatically move the vehicle 1 to the target position PT.

In the example shown in FIG. 3, the automatic parking control device 100 includes, as functional blocks, an automatic parking control portion 110, an engine control portion 120, and a brake control portion 130. The engine control portion 120 controls an operation of the engine 20 so as to control the drive power. The brake control portion 130 controls an operation of the braking system 30 so as to control the braking force. The automatic parking control portion 110 executes the target position setting process. The automatic parking control portion 110 also executes the vehicle travel control together with the engine control portion 120 and the brake control portion 130.

The function of the automatic parking control device 100 is realized when the processor in the ECU executes a control program that is stored in the memory. The control program may be stored in a computer-readable storage medium. The automatic parking control portion 110, the engine control portion 120, and the brake control portion 130 may be realized by different ECUs.

A detailed description will hereinafter be provided on the process executed by the automatic parking control device 100 according to the embodiment.

Figure 4:
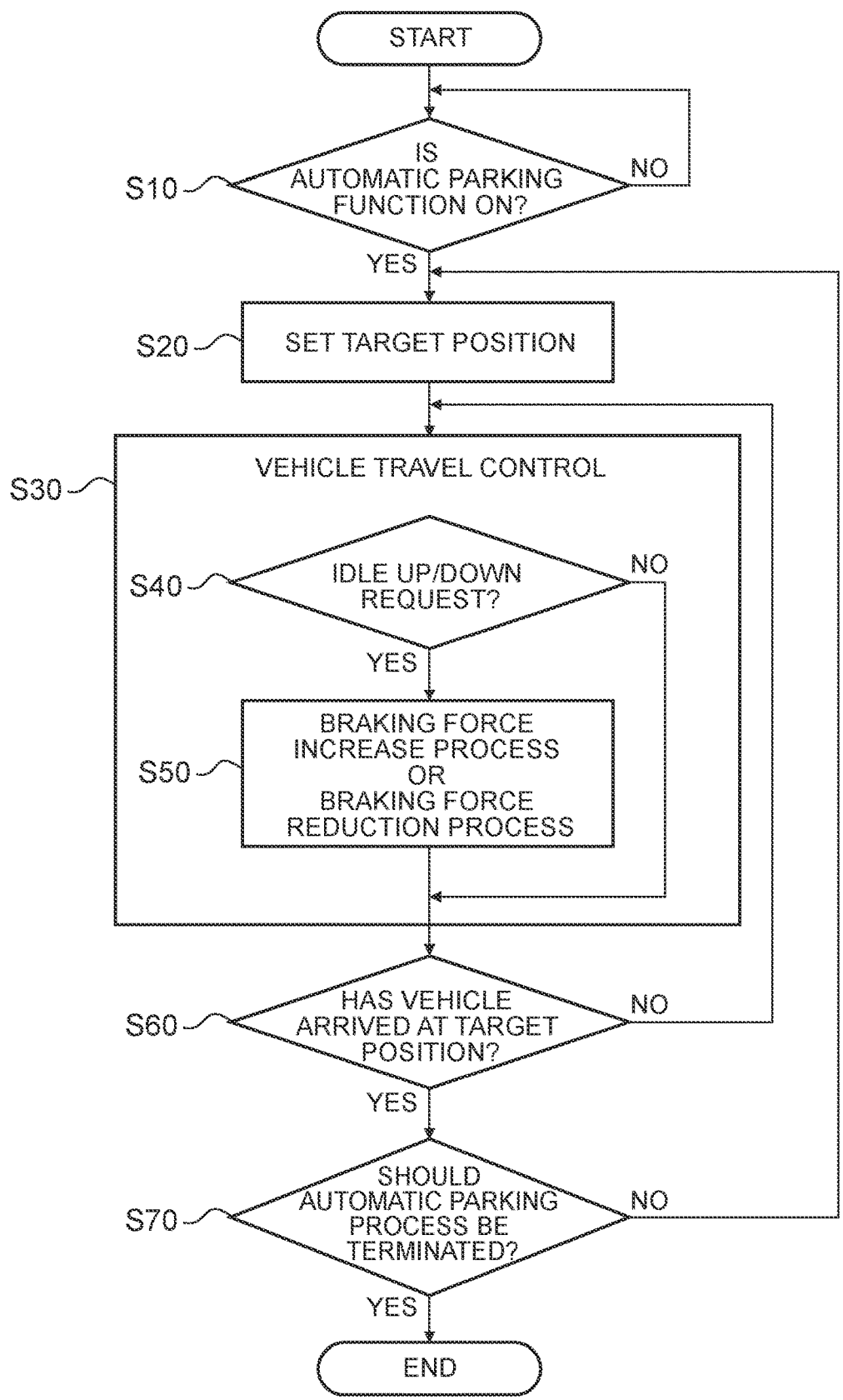
FIG. 4 is a flowchart of a process executed by an automatic parking control device in the automatic parking system according to the first embodiment of the disclosure.

FIG. 4 is a flowchart of the process executed by the automatic parking control device 100 in the automatic parking system 10 according to the embodiment.

The automatic parking control portion 110 detects that the automatic parking function is turned ON. The automatic parking switch for turning the automatic parking function ON/OFF is provided in the HMI unit 50. The driver can turn the automatic parking function ON by operating the automatic parking switch. When detecting that the automatic parking function is ON (step S10; YES), the automatic parking control portion 110 starts the automatic parking process. Then, the process proceeds to step S20.

The automatic parking control portion 110 executes the "target position setting process" to set the target position PT. This target position setting process is executed on the basis of the detected information that is received from the sensor group 40.

For example, the sensor group 40 includes the camera that captures the image of the situation around the vehicle 1. A parking space that is surrounded by white lines or the like can be recognized by performing image analysis on the imaging information captured by the camera. The automatic parking control portion 110 automatically sets the target position PT in consideration of the recognized parking space, size of the vehicle 1, and the like. The automatic parking control portion 110 may present the recognized parking space and the set target position PT on the display in the HMI unit 50. The driver can check the parking space and the target position PT on the display.

Alternatively, the driver may specify the parking space and the target position PT. For example, the automatic parking control portion 110 presents the imaging information captured by the camera on the display in the HMI unit 50. The driver specifies the parking space and the target position PT in the displayed image with the use of the input device in the HMI unit 50.

When the target position PT is set, the process proceeds to step S30.

The automatic parking control portion 110, the engine control portion 120, and the brake control portion 130 executes the "vehicle travel control" to control the drive power and the braking force so as to automatically move the vehicle 1 to the target position PT.

More specifically, the automatic parking control portion 110 requests the engine control portion 120 to operate the engine 20 at the idle speed. The engine control portion 120 calculates and retains the idle speed (a target value) of the engine 20.

In response to the request from the automatic parking control portion 110, the engine control portion 120 operates the engine 20 at the idle speed. The engine 20 generates the drive power (the creep torque) that corresponds to the idle speed.

In addition, the engine control portion 120 calculates the drive power that corresponds to the idle speed with the use of a map or the like. Then, the engine control portion 120 sends information indicative of the calculated drive power to the automatic parking control portion 110. The automatic parking control portion 110 receives information on the current drive power from the engine control portion 120.

Based on the detected information that is received from the sensor group 40, the automatic parking control portion 110 calculates the remaining distance X from the current position of the vehicle 1 to the target position PT. For example, the target position PT can be recognized by performing image analysis on the imaging information captured by the camera, and thus the remaining distance X to the target position PT can be calculated. Alternatively, the remaining distance X can be calculated from a distance to an obstacle that is detected by the ultrasonic sonar (the clearance sonar). Further alternatively, the travel distance of the vehicle 1 is calculated on the basis of the detection result obtained by the wheel rotational speed sensor, and the remaining distance X to the target position PT can thereby be calculated.

The automatic parking control portion 110 executes the vehicle speed control on the basis of the remaining distance X and the current drive power. A target vehicle speed for the automatic parking is expressed as a function of the remaining distance X (when the remaining distance X=0, the target vehicle speed becomes 0 (zero)). The target vehicle speed is the extremely low speed that is lower than the speed during the creep travel. Such an extremely low speed is realized by combining the braking force and the drive power (the creep torque) that corresponds to the idle speed. Accordingly, based on the current drive power and the remaining distance X, the automatic parking control portion 110 calculates a target braking force that is required to obtain the target vehicle speed. Then, the automatic parking control portion 110 sends information indicative of the calculated target braking force to the brake control portion 130.

The brake control portion 130 receives the information indicative of the target braking force from the automatic parking control portion 110. The brake control portion 130 controls the operation of the braking system 30 so as to be able to obtain the target braking force. The vehicle 1 approaches the target position PT at a speed that is determined by the combination of the drive power and the braking force.

There is a case where the request to increase or reduce the idle speed of the engine 20 (the idle UP/DOWN request) is generated during the vehicle travel control (step S30). For example, in the case where the air conditioner is turned ON, an "idle UP request" to request the increase in the idle speed is generated. On the other hand, in the case where the air conditioner is turned OFF, an "idle DOWN request" to request the reduction in the idle speed is generated.

The engine control portion 120 receives the idle UP/DOWN request. During the vehicle travel control (step S30), when the engine control portion 120 receives the idle UP/DOWN request (step S40; YES), the process proceeds to step S50. Otherwise (step S40; NO), the process skips step S50 and proceeds to step S60.

The engine control portion 120 increases/reduces the idle speed in response to the idle UP/DOWN request. Then, the engine control portion 120 operates the engine 20 at the changed idle speed. As a result, the drive power (the creep torque) that corresponds to the idle speed changes. Timing at which the drive power is changed is the "drive power change timing".

In addition, the engine control portion 120 calculates a drive power change amount (i.e., an amount by which the drive power is changed) that corresponds to the change of the idle speed. Then, the engine control portion 120 sends information indicative of the calculated drive power change amount to the automatic parking control portion 110.

The automatic parking control portion 110 receives the information indicative of the drive power change amount from the engine control portion 120. Then, in order to offset the change of the drive power, the automatic parking control portion 110 executes the above-described braking force change process (the braking force increase process or the braking force reduction process). More specifically, the automatic parking control portion 110 calculates a braking force change amount (i.e., an amount by which the braking force is changed) that is required to offset the change of the drive power. Then, the automatic parking control portion 110 sends information indicative of the calculated braking force change amount to the brake control portion 130.

The brake control portion 130 receives the information indicative of the braking force change amount from the automatic parking control portion 110. The brake control portion 130 controls the operation of the braking system 30 such that the braking force is changed by the braking force change amount. As a result, the braking force is changed. Timing at which the braking force is changed is the "braking force change timing".

The drive power change timing and the braking force change timing are determined depending on the signal transmission time period, the calculation processing time period, the calculation cycle, the actuator response speed, and so on. In order to effectively offset the change of the drive power, it is desirable that the drive power change timing and the braking force change timing should match each other. In the embodiment, the automatic parking control portion 110, the engine control portion 120, and the brake control portion 130 are basically designed such that the drive power change timing and the braking force change timing match each other.

However, in reality, it is difficult to cause the drive power change timing and the braking force change timing to exactly match each other. Accordingly, as described above, a certain deviation (difference) between the drive power change timing and the braking force change timing is permitted in the embodiment. Instead, as described with reference to FIG. 2, the braking force change timing is adjusted so that the occupant can feel the motion of the vehicle 1 as "appropriate motion".

The automatic parking control portion 110 adjusts the braking force change timing. A time period from a time at which the automatic parking control portion 110 receives the information indicative of the drive power change amount from the engine control portion 120 to a time at which the automatic parking control portion 110 sends the information indicative of the braking force change amount to the brake control portion 130 will hereinafter be referred to as an "adjustment time period". The automatic parking control portion 110 can adjust the braking force change timing by changing this adjustment time period.

Figure 5:
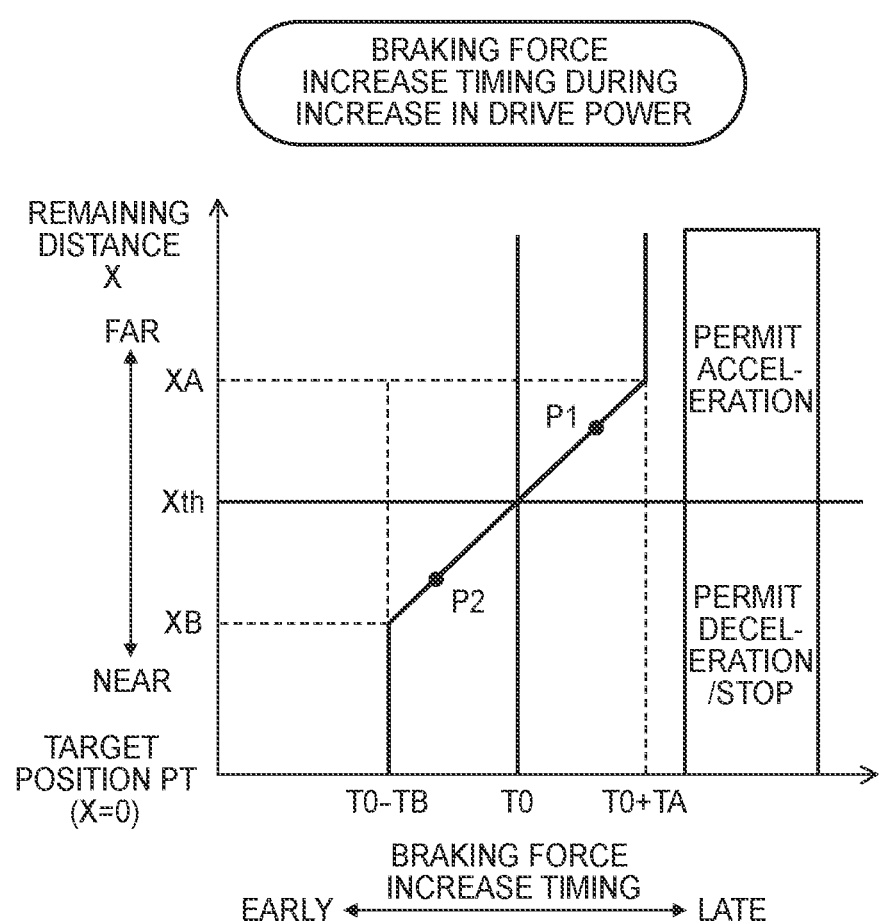
FIG. 5 is a conceptual graph showing an example in which braking force increase timing is set in the first embodiment of the disclosure.

FIG. 5 shows an example in which the braking force increase timing is set in the case where the drive power is increased. A vertical axis represents the remaining distance X, and a horizontal axis represents the braking force increase timing. In the case where the remaining distance X is equal to a threshold Xth (X=Xth), the braking force increase timing is set to reference timing T0. For example, the threshold Xth is a maximum value at which the stop of the vehicle 1 is permitted, and is derived in accordance with a degree of accuracy of the sensor, or the like.

In the case where the remaining distance X is longer than the threshold Xth, the vehicle 1 is located relatively far from the target position PT, and thus the acceleration thereof is permitted. In this case, the braking force increase timing is adjusted to be later than the reference timing T0. For example, when the remaining distance X is longer than a specified value XA (>Xth), the braking force increase timing is set to upper limit timing T0+TA. As the remaining distance X decreases from the specified value XA, the braking force increase timing is gradually advanced from the upper limit timing T0+TA. Then, when the remaining distance X decreases to the threshold Xth, the braking force increase timing becomes the reference timing T0.

In the case where the remaining distance X is shorter than the threshold Xth, the vehicle 1 is located relatively close to the target position PT, and thus the deceleration or the stop thereof is permitted. In this case, the braking force increase timing is adjusted to be earlier than the reference timing T0. For example, as the remaining distance X decreases from the threshold Xth, the braking force increase timing is gradually advanced from the reference timing T0. When the remaining distance X decreases to a specified value XB (<Xth), the braking force increase timing becomes lower limit timing T0−TB. When the remaining distance X is shorter than the specified value XB, the braking force increase timing is set to the lower limit timing T0−TB.

FIG. 5 also shows the two representative positions that are the first position P1 and the second position P2. The first position P1 is the position relatively far from the target position PT, and the second position P2 is the position relatively close to the target position PT. The braking force increase timing at the first position P1 is later than the braking force increase timing at the second position P2. The braking force increase timing is advanced as the vehicle 1 moves from the first position P1 to the second position P2.

Figure 6:
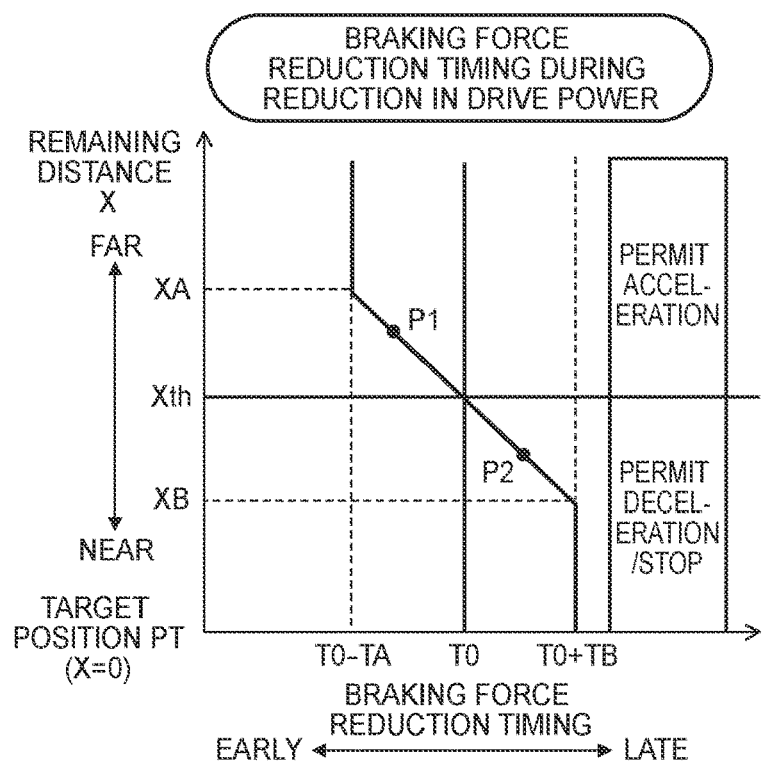
FIG. 6 is a conceptual graph showing an example in which braking force reduction timing is set in the first embodiment of the disclosure.

FIG. 6 shows an example in which the braking force reduction timing is set in the case where the drive power is reduced. FIG. 6 has the same format as that of FIG. 5.

In the case where the remaining distance X is longer than the threshold Xth, the vehicle 1 is located relatively far from the target position PT, and thus the acceleration thereof is permitted. In this case, the braking force reduction timing is adjusted to be earlier than the reference timing T0. For example, when the remaining distance X is longer than the specified value XA (>Xth), the braking force reduction timing is set to lower limit timing T0−TA. As the remaining distance X decreases from the specified value XA, the braking force reduction timing is gradually delayed from the lower limit timing T0−TA. Then, when the remaining distance X decreases to the threshold Xth, the braking force reduction timing becomes the reference timing T0.

In the case where the remaining distance X is shorter than the threshold Xth, the vehicle 1 is located relatively close to the target position PT, and thus the deceleration or the stop thereof is permitted. In this case, the braking force reduction timing is adjusted to be later than the reference timing T0. For example, as the remaining distance X decreases from the threshold Xth, the braking force reduction timing is gradually delayed from the reference timing T0. When the remaining distance X decreases to the specified value XB (<Xth), the braking force reduction timing becomes upper limit timing T0+TB. When the remaining distance X is shorter than the specified value XB, the braking force reduction timing is set to the upper limit timing T0+TB.

FIG. 6 also shows the two representative positions that are the first position P1 and the second position P2. The first position P1 is the position relatively far from the target position PT, and the second position P2 is the position relatively close to the target position PT. The braking force reduction timing at the first position P1 is earlier than the braking force reduction timing at the second position P2. The braking force reduction timing is delayed as the vehicle 1 moves from the first position P1 to the second position P2.

When the braking force change process (the braking force increase process or the braking force reduction process) is completed, the process proceeds to step S60.

The automatic parking control portion 110 determines whether the vehicle 1 has arrived at the target position PT. If the vehicle 1 has not arrived at the target position PT (step S60; NO), the process returns to step S30. If the vehicle 1 has arrived at the target position PT (step S60; YES), the process proceeds to step S70.

The automatic parking control portion 110 determines whether to terminate the automatic parking process. If the vehicle 1 needs to go back or needs to perform a parking process again (step S70; NO), the process returns to step S20. Otherwise (step S70; YES), the automatic parking control portion 110 terminates the automatic parking process.

As described so far, according to the embodiment, in the case where the idle speed changes such that the drive power changes during the vehicle travel control for the automatic parking, the braking force change process is executed so as to offset the change of the drive power. In this braking force change process, the braking force change timing is set such that the occupant can feel that the motion of the vehicle 1 is the "appropriate motion".

More specifically, in the braking force increase process, the braking force increase timing at the first position P1 that is far from the target position PT is set to be later than the braking force increase timing at the second position P2 that is close to the target position PT. In addition, in the braking force reduction process, the braking force reduction timing at the first position P1 that is far from the target position PT is set to be earlier than the braking force reduction timing at the second position P2 that is close to the target position PT.

As a result, at the first position P1 that is far from the target position PT, the vehicle 1 is more likely to accelerate while the vehicle 1 is less likely to decelerate. The acceleration at the position far from the target position PT is felt as the "acceleration for promptly approaching the target position PT" and thus is appropriate. In contrast, at the second position P2 that is close to the target position PT, the vehicle 1 is more likely to decelerate while the vehicle 1 is less likely to accelerate. The deceleration at the position close to the target position PT is felt as the "deceleration for stopping at the target position PT shortly" and thus is appropriate. Thus, the motion of the vehicle 1 felt as natural and appropriate motion by the occupant is realized. In other words, it is possible to reduce the sense of discomfort felt by the occupant of the vehicle 1 during the vehicle travel control for the automatic parking.

In addition, since the vehicle 1 is less likely to accelerate at the second position P2 that is close to the target position PT, it is possible to reduce the possibility that the vehicle 1 passes the target position PT. Furthermore, since the vehicle 1 is less likely to decelerate at the first position P1 that is far from the target position PT, it is possible to reduce the possibility that the vehicle 1 stops before arriving at the target position PT. Thus, the accuracy of the automatic parking function is improved. As a result, the reliability of the automatic parking system 10 is improved.

Hereinafter, a second embodiment of the disclosure will be described. In the above-described first embodiment, the "braking force change timing" in the braking force change process is adjusted in accordance with the remaining distance X to the target position PT. In the second embodiment of the disclosure, the "braking force change amount" in the braking force change process is adjusted in accordance with the remaining distance X to the target position PT. The basic idea in the second embodiment is the same as that in the first embodiment. A description overlapping with the description of the first embodiment will be appropriately omitted.

Figure 7:
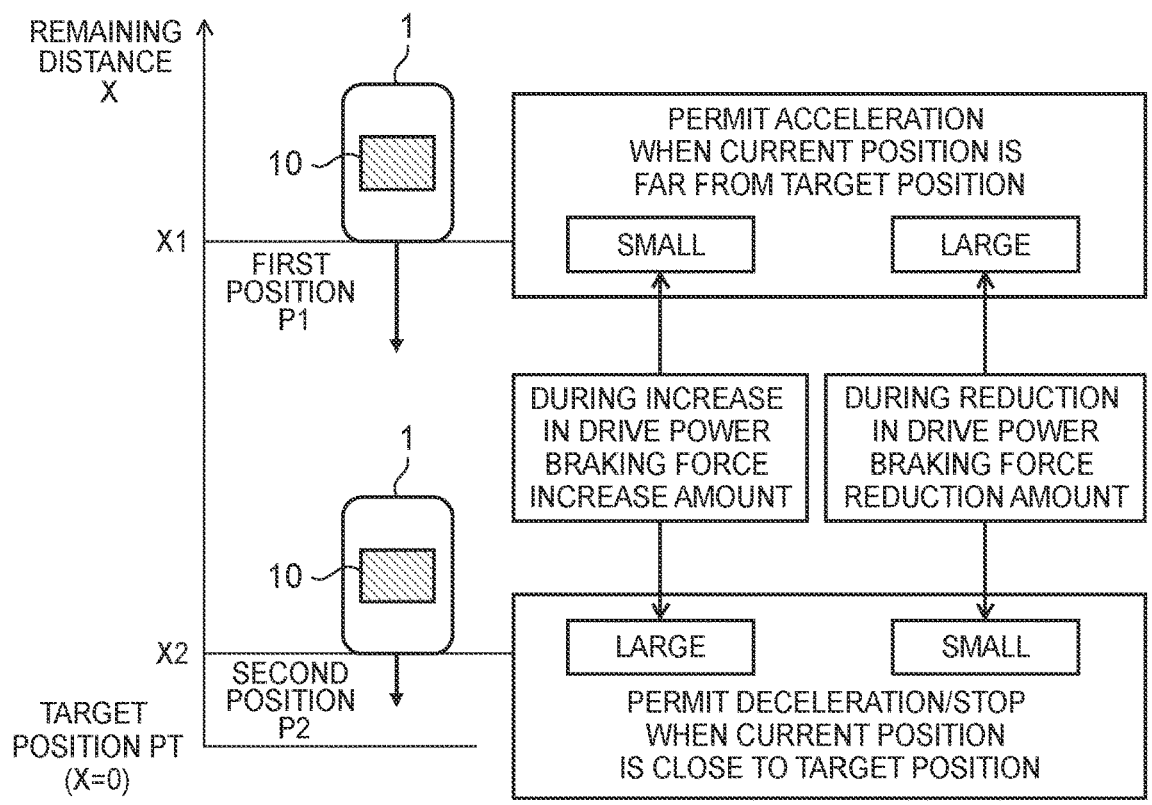
FIG. 7 is a conceptual view illustrating an overview of a braking force change process in an automatic parking system according to a second embodiment of the disclosure.

FIG. 7 is a conceptual view illustrating an overview of the braking force change process (the braking force increase process and the braking force reduction process) according to the embodiment. FIG. 7 has the same format as that of FIG. 2 described above.

First, the case where the drive power changes at the first position P1 that is far from the target position PT will be considered. In the case where the drive power is increased at the first position P1, the automatic parking system 10 reduces a braking force increase amount (i.e., an amount by which the braking force is increased) in the braking force increase process (in other words, the automatic parking system 10 sets the braking force increase amount to a relatively small amount). In the case where the drive power is reduced at the first position P1, the automatic parking system 10 increases a braking force reduction amount (i.e., an amount by which the braking force is reduced) in the braking force reduction process (in other words, the automatic parking system 10 sets the braking force reduction amount to a relatively large amount). As a result of such adjustment of the braking force change amount, the vehicle 1 is more likely to accelerate while the vehicle 1 is less likely to decelerate or stop. Even when the vehicle 1 accelerates, such acceleration is felt as natural and appropriate motion.

Next, the case where the drive power changes at the second position P2 that is close to the target position PT will be considered. In the case where the drive power is increased at the second position P2, the automatic parking system 10 increases the braking force increase amount in the braking force increase process (in other words, the automatic parking system 10 sets the braking force increase amount to a relatively large amount). In the case where the drive power is reduced at the second position P2, the automatic parking system 10 reduces the braking force reduction amount in the braking force reduction process (in other words, the automatic parking system 10 sets the braking force reduction amount to a relatively small amount). As a result of such adjustment of the braking force change amount, the vehicle 1 is more likely to decelerate or stop while the vehicle 1 is less likely to accelerate. Even when the vehicle 1 decelerates or stops, such deceleration or a stop is felt as natural and appropriate motion.

As described above, the automatic parking system 10 sets (adjusts) the braking force change amount in the braking force change process in accordance with the remaining distance X to the target position PT. As shown in FIG. 7, in the case where the braking force increase process is executed at the first position P1, the braking force increase amount is set to be small, as compared to the case where the braking force increase process is executed at the second position P2. In addition, in the case where the braking force reduction process is executed at the first position P1, the braking force reduction amount is set to be large, as compared to the case where the braking force reduction process is executed at the second position P2. With such settings, the motion of the vehicle 1 felt as natural and appropriate motion by the occupant is realized.

A configuration of the automatic parking system 10 according to the embodiment is the same as that shown in FIG. 3 described above. A flow of the process executed by the automatic parking control device 100 is also the same as that shown in FIG. 4 described above. When the braking force change process in step S50 is executed, the automatic parking control portion 110 adjusts the "braking force change amount" in accordance with the remaining distance X.

Figure 8:
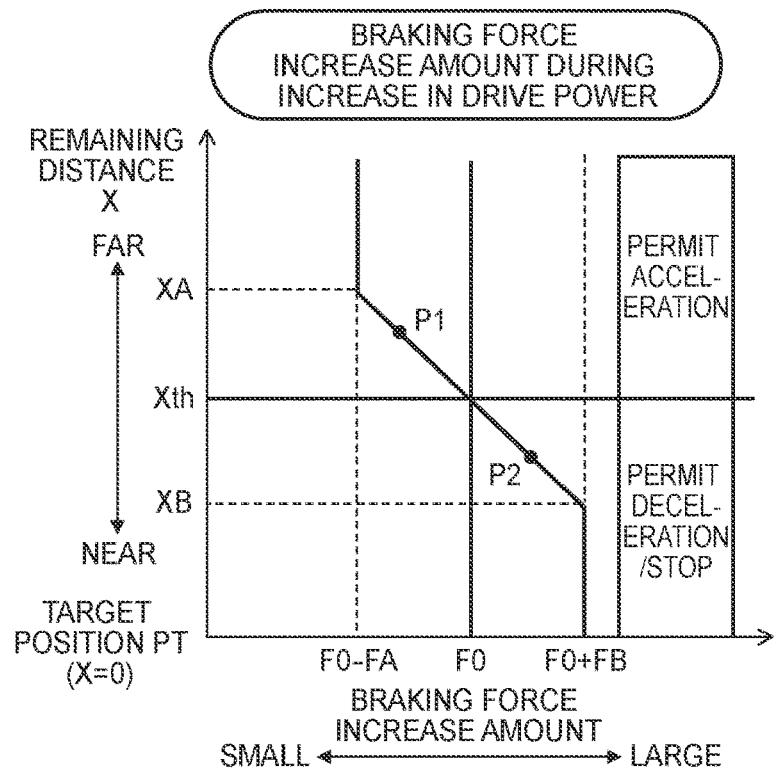
FIG. 8 is a conceptual graph showing an example in which a braking force increase amount is set in the second embodiment of the disclosure.

FIG. 8 shows an example in which the braking force increase amount is set in the case where the drive power is increased. A vertical axis represents the remaining distance X, and a horizontal axis represents the braking force increase amount. In the case where the remaining distance X is equal to the threshold Xth (X=Xth), the braking force increase amount is set to a reference amount F0. The reference amount F0 corresponds to the drive power change amount that is notified by the engine control portion 120, for example. For example, the threshold Xth is the maximum value at which the stop of the vehicle 1 is permitted, and is derived in accordance with the degree of accuracy of the sensor, or the like.

In the case where the remaining distance X is longer than the threshold Xth, the vehicle 1 is located relatively far from the target position PT, and thus the acceleration thereof is permitted. In this case, the braking force increase amount is adjusted to be smaller than the reference amount F0. For example, when the remaining distance X is longer than the specified value XA (>Xth), the braking force increase amount is set to a lower limit amount F0−FA. As the remaining distance X decreases from the specified value XA, the braking force increase amount is gradually increased from the lower limit amount F0−FA. Then, when the remaining distance X decreases to the threshold Xth, the braking force increase amount becomes the reference amount F0.

In the case where the remaining distance X is shorter than the threshold Xth, the vehicle 1 is located relatively close to the target position PT, and thus the deceleration or the stop thereof is permitted. In this case, the braking force increase amount is adjusted to be larger than the reference amount F0. For example, as the remaining distance X decreases from the threshold Xth, the braking force increase amount is gradually increased from the reference amount F0. When the remaining distance X decreases to the specified value XB (<Xth), the braking force increase amount becomes an upper limit amount F0+FB. When the remaining distance X is shorter than the specified value XB, the braking force increase amount is set to the upper limit amount F0+FB.

FIG. 8 also shows the two representative positions that are the first position P1 and the second position P2. The first position P1 is the position relatively far from the target position PT, and the second position P2 is the position relatively close to the target position PT. The braking force increase amount at the first position P1 is smaller than the braking force increase amount at the second position P2. The braking force increase amount is increased as the vehicle 1 moves from the first position P1 to the second position P2.

Figure 9:
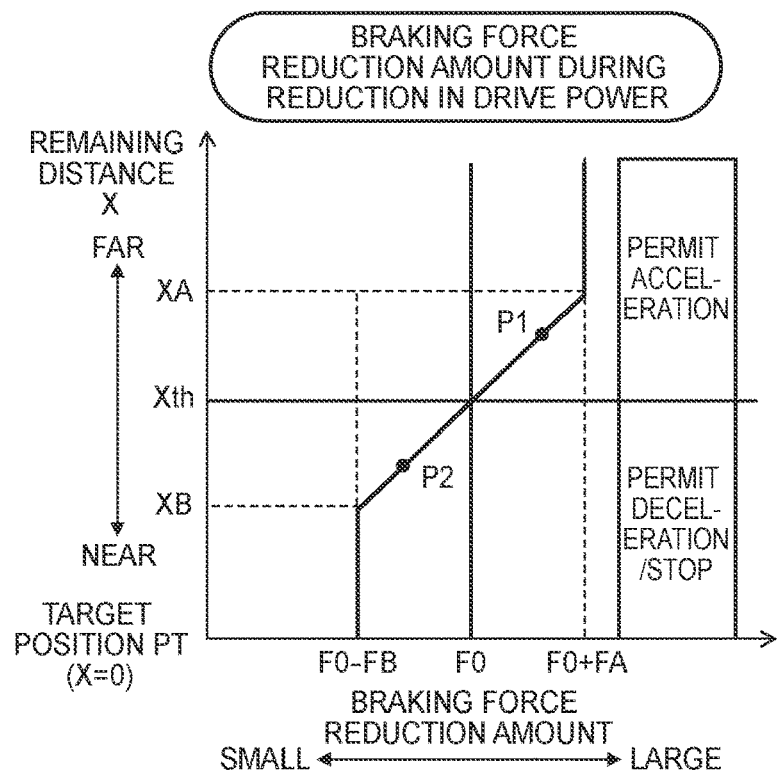
FIG. 9 is a conceptual graph showing an example in which a braking force reduction amount is set in the second embodiment of the disclosure.

FIG. 9 shows an example in which the braking force reduction amount is set in the case where the drive power is reduced. FIG. 9 has the same format as that of FIG. 8.

In the case where the remaining distance X is longer than the threshold Xth, the vehicle 1 is located relatively far from the target position PT, and thus the acceleration thereof is permitted. In this case, the braking force reduction amount is adjusted to be larger than the reference amount F0. For example, when the remaining distance X is longer than the specified value XA (>Xth), the braking force reduction amount is set to an upper limit amount F0+FA. As the remaining distance X decreases from the specified value XA, the braking force reduction amount is gradually reduced from the upper limit amount F0+FA. Then, when the remaining distance X decreases to the threshold Xth, the braking force reduction amount becomes the reference amount F0.

In the case where the remaining distance X is shorter than the threshold Xth, the vehicle 1 is located relatively close to the target position PT, and thus the deceleration or the stop thereof is permitted. In this case, the braking force reduction amount is adjusted to be smaller than the reference amount F0. For example, as the remaining distance X decreases from the threshold Xth, the braking force reduction amount is gradually reduced from the reference amount F0. When the remaining distance X decreases to the specified value XB (<Xth), the braking force reduction amount becomes a lower limit amount F0−FB. When the remaining distance X is shorter than the specified value XB, the braking force reduction amount is set to the lower limit amount F0−FB.

FIG. 9 also shows the two representative positions that are the first position P1 and the second position P2. The first position P1 is the position relatively far from the target position PT, and the second position P2 is the position relatively close to the target position PT. The braking force reduction amount at the first position P1 is larger than the braking force reduction amount at the second position P2. The braking force reduction amount is reduced as the vehicle 1 moves from the first position P1 to the second position P2.

According to the embodiment, effects that are the same as or similar to those in the first embodiment can be obtained. That is, it is possible to reduce the sense of discomfort felt by the occupant of the vehicle 1 during the vehicle travel control for the automatic parking. In addition, the accuracy of the automatic parking function is improved. As a result, the reliability of the automatic parking system 10 is improved.

The first embodiment and the second embodiment may be combined. In this case, both of the "braking force change timing" and the "braking force change amount" in the braking force change process are adjusted in accordance with the remaining distance X to the target position PT. In this way, the effects of the embodiments are further enhanced.

Hereinafter, a third embodiment of the disclosure will be described. The third embodiment of the disclosure relates to a method of changing the drive power in response to the idle UP/DOWN request. A description overlapping with the descriptions of the above-described embodiments will be appropriately omitted.

Figure 10:
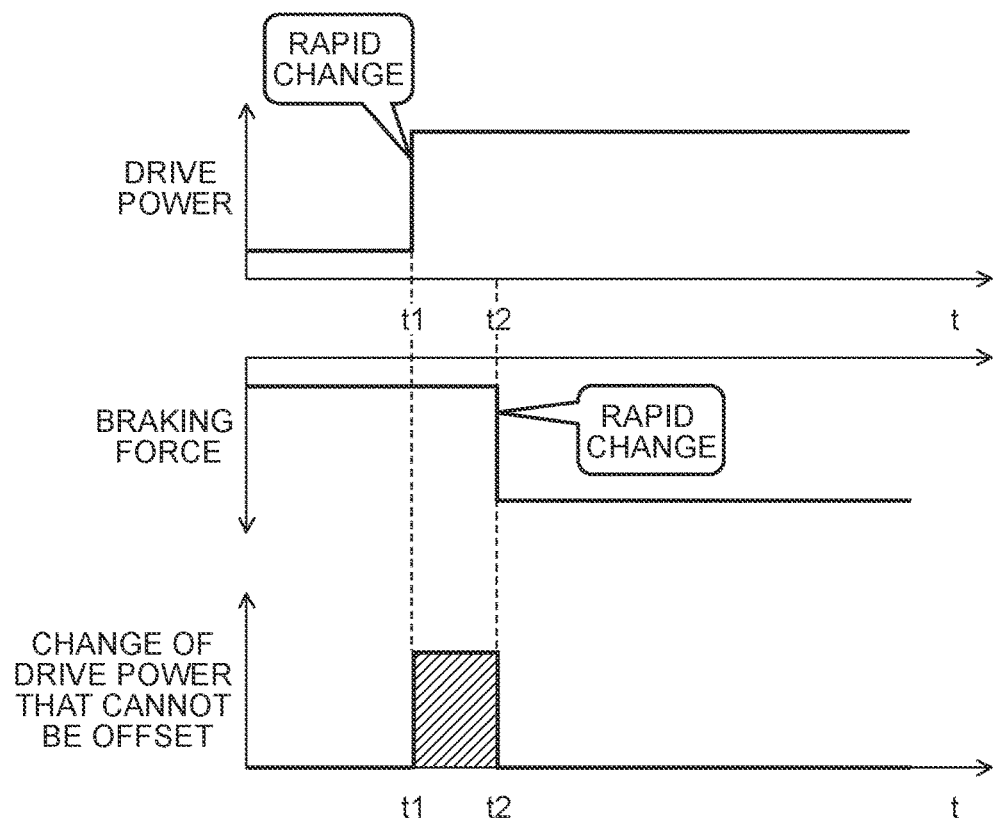
FIG. 10 is a timing chart illustrating a change of drive power according to a comparative example.

First, a description will be provided on the change of the drive power in a comparative example with reference to FIG. 10. In the comparative example, the drive power is rapidly changed in response to the idle UP/DOWN request. For example, at time t1, the idle UP request is input, and a process of increasing the idle speed and the drive power is started. At this time, the drive power is rapidly increased. At time t2 after the time t1, the braking force increase process is started to offset the increase in the drive power. In order to offset the rapid increase in the drive power, the braking force is also rapidly increased. In a time period from the time t1 to the time t2, the change of the drive power that cannot be offset remains. The change of the drive power that cannot be offset causes an acceleration/deceleration shock that corresponds to a magnitude of the change of the drive power.

Figure 11:
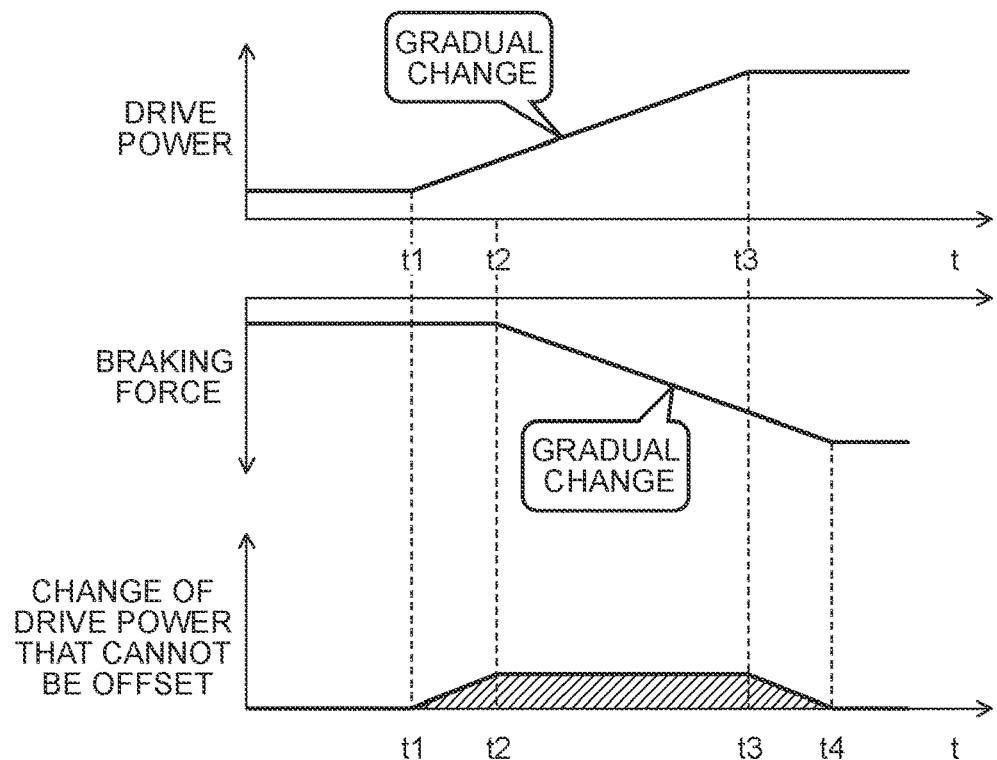
FIG. 11 is a timing chart illustrating drive power control executed by an automatic parking system according to a third embodiment of the disclosure.

Next, a description will be provided on the change of the drive power according to the embodiment with reference to FIG. 11. In the embodiment, the drive power is gradually changed in response to the idle UP/DOWN request. This is equivalent to restriction on a jerk of the change of the drive power. For example, at the time t1, the idle UP request is input, and the process of increasing the idle speed and the drive power is started. In the embodiment, the drive power is not rapidly increased, and the drive power is gradually increased from the time t1 to time t3. At the time t2 after the time t1, the braking force increase process is started to offset the increase in the drive power. In order to gradually offset the drive power, the braking force is also gradually increased from the time t2 to time t4. In the case where the drive power is gradually reduced, the braking force is gradually reduced.

As a result, in a time period from the time t1 to the time t4, the change of the drive power that cannot be offset remains. However, the magnitude of the change of the drive power that cannot be offset is significantly smaller than that in the comparative example shown in FIG. 10. Accordingly, the acceleration/deceleration shock that occurs in the vehicle 1 due to the change of the drive power is significantly reduced. In other words, an influence of the change of the drive power is reduced, and consequently the sense of discomfort felt by the occupant of the vehicle 1 is reduced. The automatic parking system 10 according to the embodiment is based on the finding that has been described so far.

A configuration of the automatic parking system 10 according to the embodiment is the same as that shown in FIG. 3 described above. A flow of the process executed by the automatic parking control device 100 is also the same as that shown in FIG. 4 described above. Only the process in step S50 differs from that in the above-described embodiments.

Figure 12:
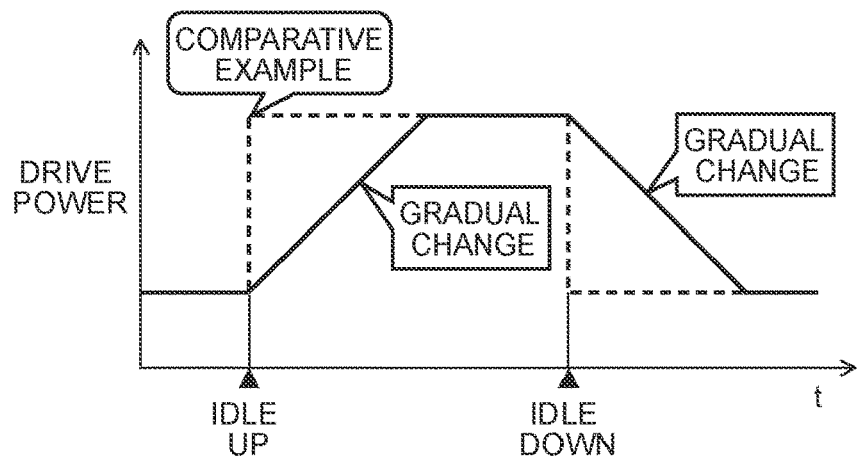
FIG. 12 is another timing chart illustrating the drive power control executed by the automatic parking system according to the third embodiment of the disclosure.

In step S50, the engine control portion 120 changes the idle speed and the drive power in response to the idle UP/DOWN request. At this time, as shown in FIG. 12, the engine control portion 120 gradually changes the drive power. More specifically, in the case where the idle UP request is present, the engine control portion 120 gradually increases the drive power. When the idle DOWN request is present, the engine control portion 120 gradually reduces the drive power.

The engine control portion 120 calculates the drive power change amount and sends the information indicative of the calculated drive power change amount to the automatic parking control portion 110. In order to offset the change of the drive power, the automatic parking control portion 110 executes the braking force change process (the braking force increase process or the braking force reduction process). At this time, the braking force change process may be executed in existing feedback control. The automatic parking control portion 110 sends the information indicative of the braking force change amount to the brake control portion 130. The brake control portion 130 changes the braking force by the braking force change amount. Since the drive power gradually changes, the braking force also gradually changes (see FIG. 11).

As described so far, according to the embodiment, in the case where the idle UP request is present, the automatic parking system 10 (the automatic parking control device 100) executes the braking force increase process while gradually increasing the drive power. In addition, in the case where the idle DOWN request is present, the automatic parking system 10 (the automatic parking control device 100) executes the braking force reduction process while gradually reducing the drive power. In this way, the influence of the change of the drive power is effectively reduced. That is, the sense of discomfort felt by the occupant of the vehicle 1 is reduced in the case where the idle UP/DOWN request is present during the vehicle travel control for the automatic parking. The effects of the embodiment can be also obtained in the case where the braking force change process is executed in the existing feedback control.

Hereinafter, a fourth embodiment of the disclosure will be described. The fourth embodiment of the disclosure relates to the control of the drive power in the case where the idle DOWN request is present. A description overlapping with the descriptions of the above-described embodiments will be appropriately omitted.

In the above-described embodiments, in the case where the idle DOWN request is present, the drive power is reduced, and the braking force is also reduced in order to offset the reduction in the drive power. However, there is also a case where the automatic parking can be performed using only the drive power (the creep torque) without using the braking force. For example, when the vehicle 1 is parked at the target position PT on an uphill, the vehicle travel control may be executed using only the drive power without using the braking force. In this case, the braking force cannot be reduced to offset the reduction in the drive power. As a result of the reduction in the drive power, the vehicle 1 may stop before arriving at the target position PT.

Figure 13:
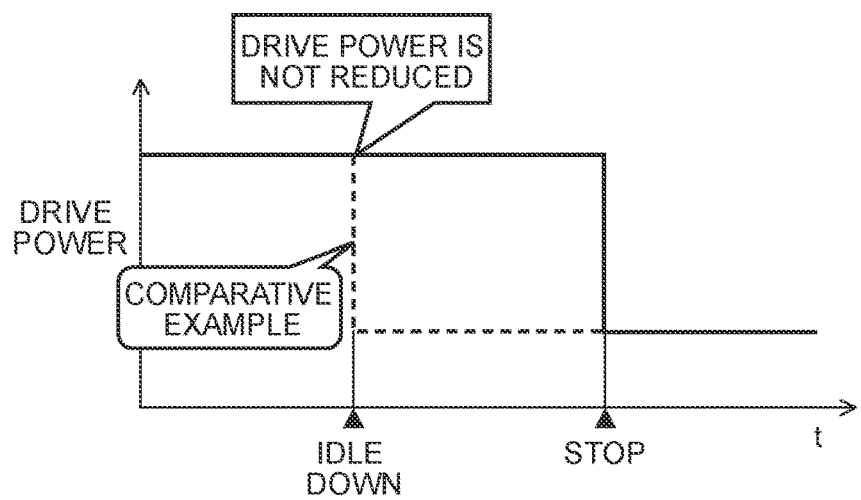
FIG. 13 is a timing chart illustrating drive power control executed by an automatic parking system according to a fourth embodiment of the disclosure.

In view of the above, in the embodiment, the drive power control is executed as shown in FIG. 13. Even when the idle DOWN request is present during the vehicle travel control, the drive power is not reduced, and the drive power is maintained. Since the drive power is not reduced, the braking force reduction process is not executed. That is, when the idle DOWN request is present, no process is executed. Since the drive power is not reduced, the vehicle 1 is prevented from being stopped before arriving at the target position PT. When the vehicle 1 stops at the target position PT, the drive power is reduced.

The drive power control according to the embodiment may be executed in the case where the vehicle travel control is executed without using the braking force. Alternatively, the drive power control according to the embodiment may be executed regardless of the braking force.

A configuration of the automatic parking system 10 according to the embodiment is the same as that shown in FIG. 3 described above. A flow of the process executed by the automatic parking control device 100 is also the same as that shown in FIG. 4 described above. Only the process in step S50 differs from that in the above-described embodiments.

In step S50, the engine control portion 120 receives the idle DOWN request. However, the engine control portion 120 does not reduce the idle speed, and does not reduce the drive power. Thus, the engine control portion 120 does not notify the automatic parking control portion 110 of the drive power change amount. The braking force reduction process is not executed.

The drive power control according to the embodiment may be applied only to the case where the vehicle travel control is executed without using the braking force. In this case, the automatic parking control portion 110 or the brake control portion 130 notifies the engine control portion 120 that the "braking force is not currently used".

As described so far, according to the embodiment, even in the case where the idle DOWN request is present during the vehicle travel control, the automatic parking system 10 (the automatic parking control device 100) does not reduce the drive power. Since the drive power is not reduced, the vehicle 1 is prevented from being stopped before arriving at the target position PT. This also contributes to reducing the sense of discomfort.

Hereinafter, a fifth embodiment of the disclosure will be described. The fifth embodiment of the disclosure relates to drive power control during the execution of the automatic parking process. A description overlapping with the descriptions of the above-described embodiments will be appropriately omitted.

Figure 14:
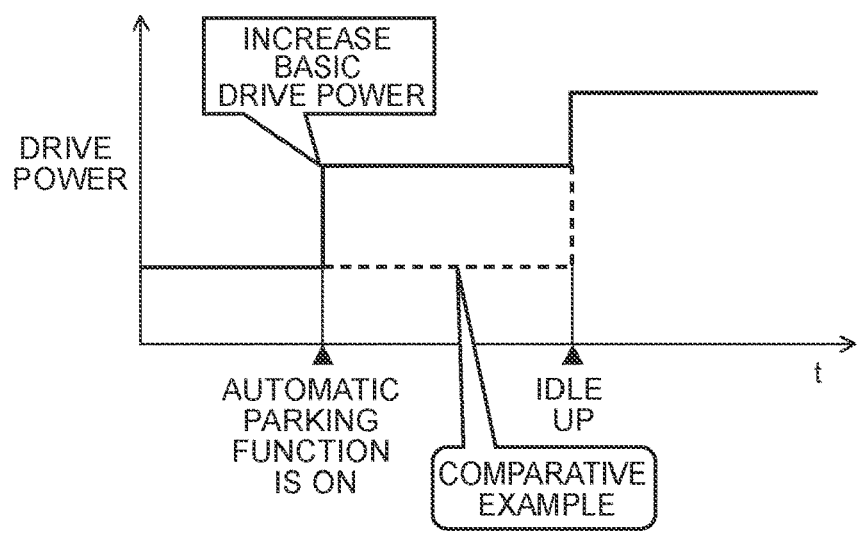
FIG. 14 is a timing chart illustrating drive power control executed by an automatic parking system according to a fifth embodiment of the disclosure.

FIG. 14 is a timing chart of the drive power control in the embodiment. The drive power during idling, that is, the drive power that corresponds to the idle speed will be hereinafter referred to as "basic drive power". According to the embodiment, when the automatic parking function is turned ON, the basic drive power is increased as compared to the basic drive power before the automatic parking function is turned ON. In other words, the basic drive power is increased in advance in response to the start of the automatic parking function. Accordingly, in the case where the idle UP request is generated thereafter, an increase amount of the drive power (i.e., an amount by which the drive power is increased) at the time is reduced. As a result, the acceleration shock due to the increase in the drive power is reduced.

A configuration of the automatic parking system 10 according to the embodiment is the same as that shown in FIG. 3 described above. A flow of the process executed by the automatic parking control device 100 is almost the same as that shown in FIG. 4 described above. However, in a time period from step S10 (the automatic parking function ON) to step S30 (the start of the vehicle travel control), the automatic parking control portion 110 provides a command to the engine control portion 120 to increase the basic drive power in advance. In response to the command, the engine control portion 120 increases the basic drive power.

As described so far, according to the embodiment, the automatic parking system 10 (the automatic parking control device 100) increases the basic drive power in response to the start of the automatic parking function. Accordingly, in the case where the idle UP request is generated during the vehicle travel control, the increase amount of the drive power (i.e., the amount by which the drive power is increased) at the time is reduced. As a result, the acceleration shock due to the increase in the drive power is reduced. This also contributes to reducing the sense of discomfort.

Next, a sixth embodiment will be described. A plurality of embodiments among the first to fifth embodiments described above may be combined as long as the combined embodiments are not contradictory to each other. For example, the first embodiment and any of the third to fifth embodiments may be combined. The effects of the embodiments are further enhanced by combining the plurality of embodiments.

What is claimed is:

1. An automatic parking control device mounted on a vehicle, the vehicle including an engine that generates drive power, and a braking system that generates a braking force, the automatic parking control device comprising
an electronic control unit configured to execute:
vehicle travel control for controlling the drive power and the braking force so as to automatically move the vehicle to a target position;
a braking force increase process for increasing the braking force in a case where an idle speed of the engine is increased such that the drive power is increased during the vehicle travel control; and
a braking force reduction process for reducing the braking force in a case where the idle speed is reduced such that the drive power is reduced during the vehicle travel control, wherein
a remaining distance from a first position to the target position is longer than a remaining distance from a second position to the target position,
the electronic control unit is configured to, in a case where the braking force increase process is executed at the first position, delay timing at which the braking force is increased, or reduce an amount by which the braking force is increased, as compared to a case where the braking force increase process is executed at the second position, and
the electronic control unit is configured to, in a case where the braking force reduction process is executed at the first position, advance timing at which the braking force is reduced or increase an amount by which the braking force is reduced, as compared to a case where the braking force reduction process is executed at the second position.

2. The automatic parking control device according to claim 1, wherein:
the electronic control unit is configured to execute the braking force increase process while gradually increasing the drive power in a case where a request to increase the idle speed is present; and
the electronic control unit is configured to execute the braking force reduction process while gradually reducing the drive power in a case where a request to reduce the idle speed is present.

3. The automatic parking control device according to claim 2, wherein:
the electronic control unit is configured to execute the braking force increase process such that the braking force is gradually increased, while gradually increasing the drive power in the case where the request to increase the idle speed is present; and
the electronic control unit is configured to execute the braking force reduction process such that the braking force is gradually reduced, while gradually reducing the drive power in the case where the request to reduce the idle speed is present.

4. The automatic parking control device according to claim 1, wherein the electronic control unit is configured not to reduce the drive power even in a case where a request to reduce the idle speed is present.

5. The automatic parking control device according to claim 1, wherein:
the drive power during idling of the engine is basic drive power; and
the electronic control unit is configured to increase the basic drive power in response to start of an automatic parking function.

6. An automatic parking system mounted on a vehicle comprising:
an engine that generates drive power;
a braking system that generates a braking force; and
an automatic parking control device, wherein
the automatic parking control device includes an electronic control unit configured to execute:
vehicle travel control for controlling the drive power and the braking force so as to automatically move the vehicle to a target position;
a braking force increase process for increasing the braking force in a case where an idle speed of the engine is increased such that the drive power is increased during the vehicle travel control; and a braking force reduction process for reducing the braking force in a case where the idle speed is reduced such that the drive power is reduced during the vehicle travel control, a remaining distance from a first position to the target position is longer than a remaining distance from a second position to the target position, the electronic control unit is configured to, in a case where the braking force increase process is executed at the first position, delay timing at which the braking force is increased, or reduce an amount by which the braking force is increased, as compared to a case where the braking force increase process is executed at the second position, and the electronic control unit is configured to, in a case where the braking force reduction process is executed at the first position, advance timing at which the braking force is reduced or increase an amount by which the braking force is reduced, as compared to a case where the braking force reduction process is executed at the second position.

\* \* \* \* \*